(12) United States Patent
Houry et al.

(10) Patent No.: US 12,212,111 B2
(45) Date of Patent: Jan. 28, 2025

(54) MODULAR FIXING SYSTEM AND METHOD THEREOF

(71) Applicant: Connecteurs Electriques Deutsch, Evreux (FR)

(72) Inventors: Laurent Houry, Evreux (FR); Thierry Cassar, Evreux (FR); Fabien Houvenaghel, Evreux (FR); Sebastien Queva, Evreux (FR)

(73) Assignee: Connecteurs Electriques Deutsch, Evreux (FR)

( * ) Notice: Subject to any disclaimer, the term of this patent is extended or adjusted under 35 U.S.C. 154(b) by 211 days.

(21) Appl. No.: 17/830,409

(22) Filed: Jun. 2, 2022

(65) Prior Publication Data

US 2022/0302612 A1 Sep. 22, 2022

Related U.S. Application Data

(63) Continuation of application No. PCT/EP2020/083678, filed on Nov. 27, 2020.

(51) Int. Cl.
*H01R 9/26* (2006.01)
*H02B 1/052* (2006.01)
*H02B 1/20* (2006.01)

(52) U.S. Cl.
CPC ......... *H01R 9/2608* (2013.01); *H01R 9/2616* (2013.01); *H02B 1/052* (2013.01); *H02B 1/205* (2013.01)

(58) Field of Classification Search
CPC ............... H01R 9/2608; H01R 9/2616; H01R 13/62961; H01R 13/62955; H01R 31/06; H02B 1/052; H02B 1/205
See application file for complete search history.

(56) References Cited

U.S. PATENT DOCUMENTS

| 2,990,534 | A | * | 6/1961 | Nielsen | H01R 9/26 439/716 |
| 3,259,876 | A | | 7/1966 | Norden | |
| 10,394,969 | B2 | | 8/2019 | Sasaki | |
| 2009/0217494 | A1 | | 9/2009 | Von Der Brelje | |
| 2014/0299732 | A1 | | 10/2014 | Grossmann | |

FOREIGN PATENT DOCUMENTS

| FR | 1087849 A | | 3/1955 |
| FR | 1140013 A | * | 7/1957 |
| FR | 2647272 A1 | | 11/1990 |

(Continued)

OTHER PUBLICATIONS

PCT International Search Report, Application No. PCT/EP2020/083678, dated Feb. 5, 2021, 6 pages.

(Continued)

*Primary Examiner* — Jean F Duverne
(74) *Attorney, Agent, or Firm* — Barley Snyder

(57) ABSTRACT

A fixing system includes a rail fixture having a plurality of first interlocking devices arranged along the rail fixture and a plurality of interlocking modules each having a second interlocking device. The interlocking modules are affixed to the rail fixture by inserting the second interlocking devices through a plurality of gaps between the first interlocking devices and sliding the interlocking modules along the rail fixture into a positive lock.

17 Claims, 10 Drawing Sheets

(56) References Cited

FOREIGN PATENT DOCUMENTS

| JP | S5775450 U | 5/1982 |
| JP | 6338389 U | 3/1988 |
| JP | 2000286027 A | 10/2000 |
| JP | 2002134213 A | 5/2002 |

OTHER PUBLICATIONS

Partial European Search Report, Application No. 19306545.5-1201, dated May 18, 2020, 17 pages.
Extended European Search Report, Application No. 19306545.5-1201, dated Aug. 14, 2020, 13 pages.

\* cited by examiner

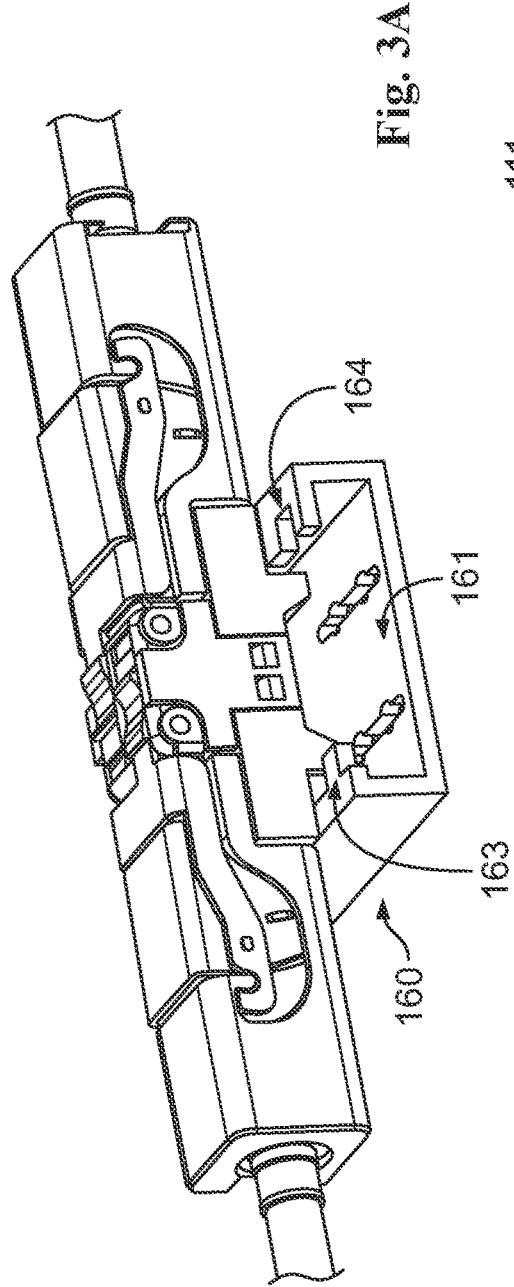
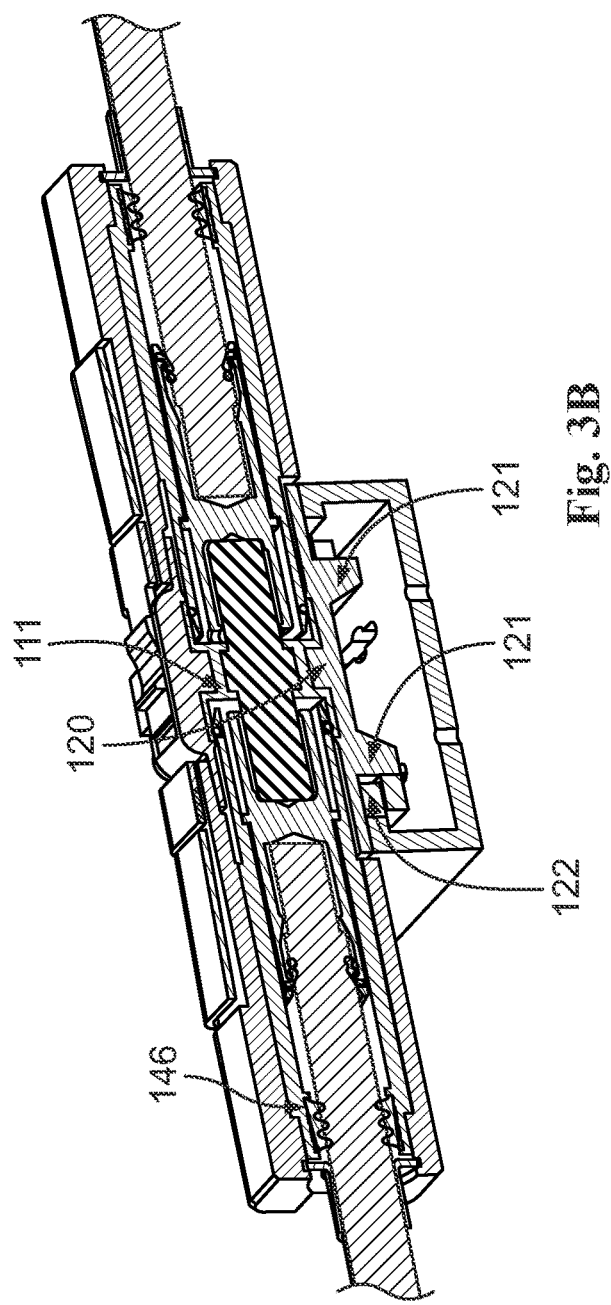

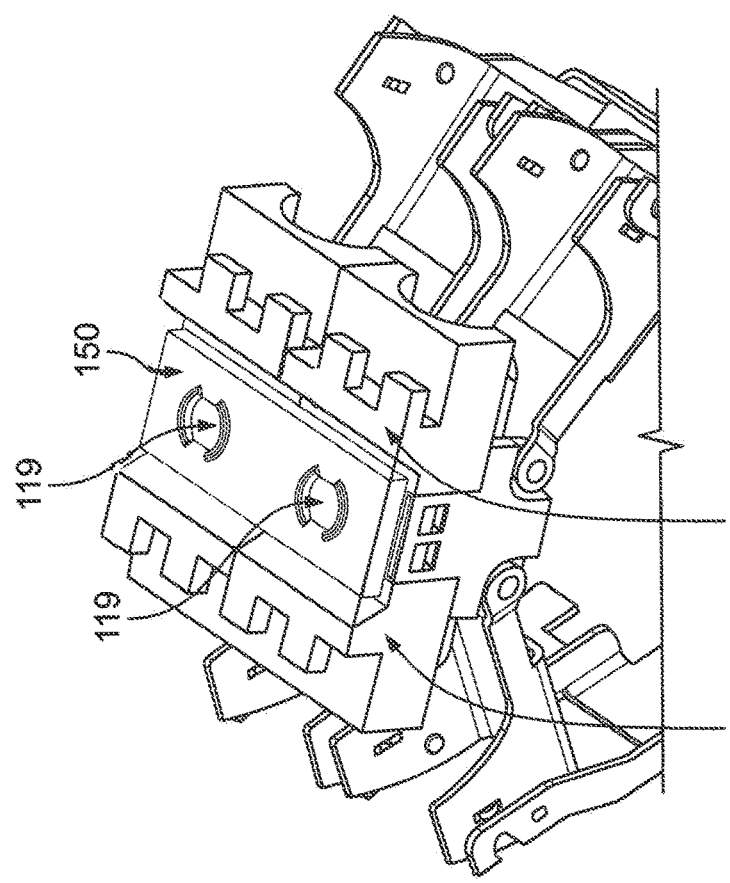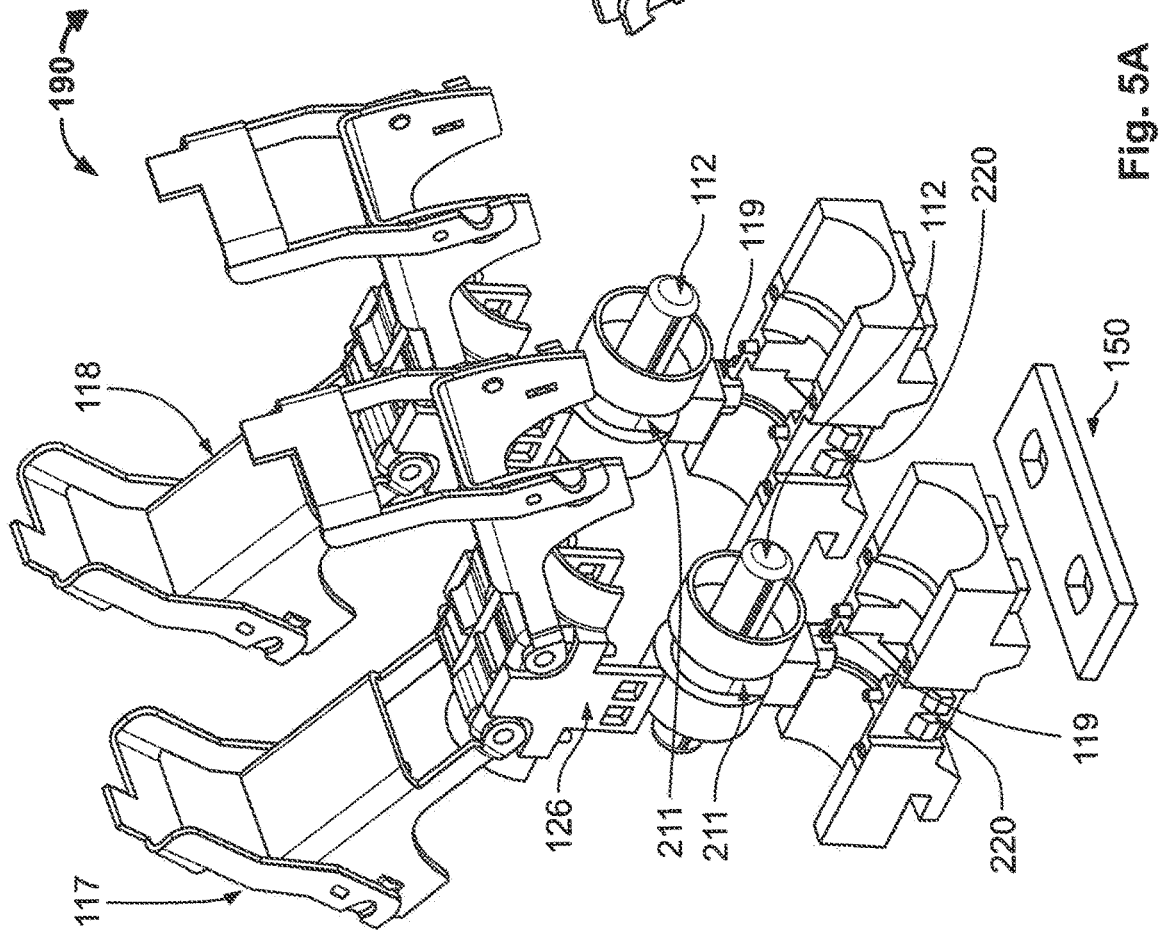

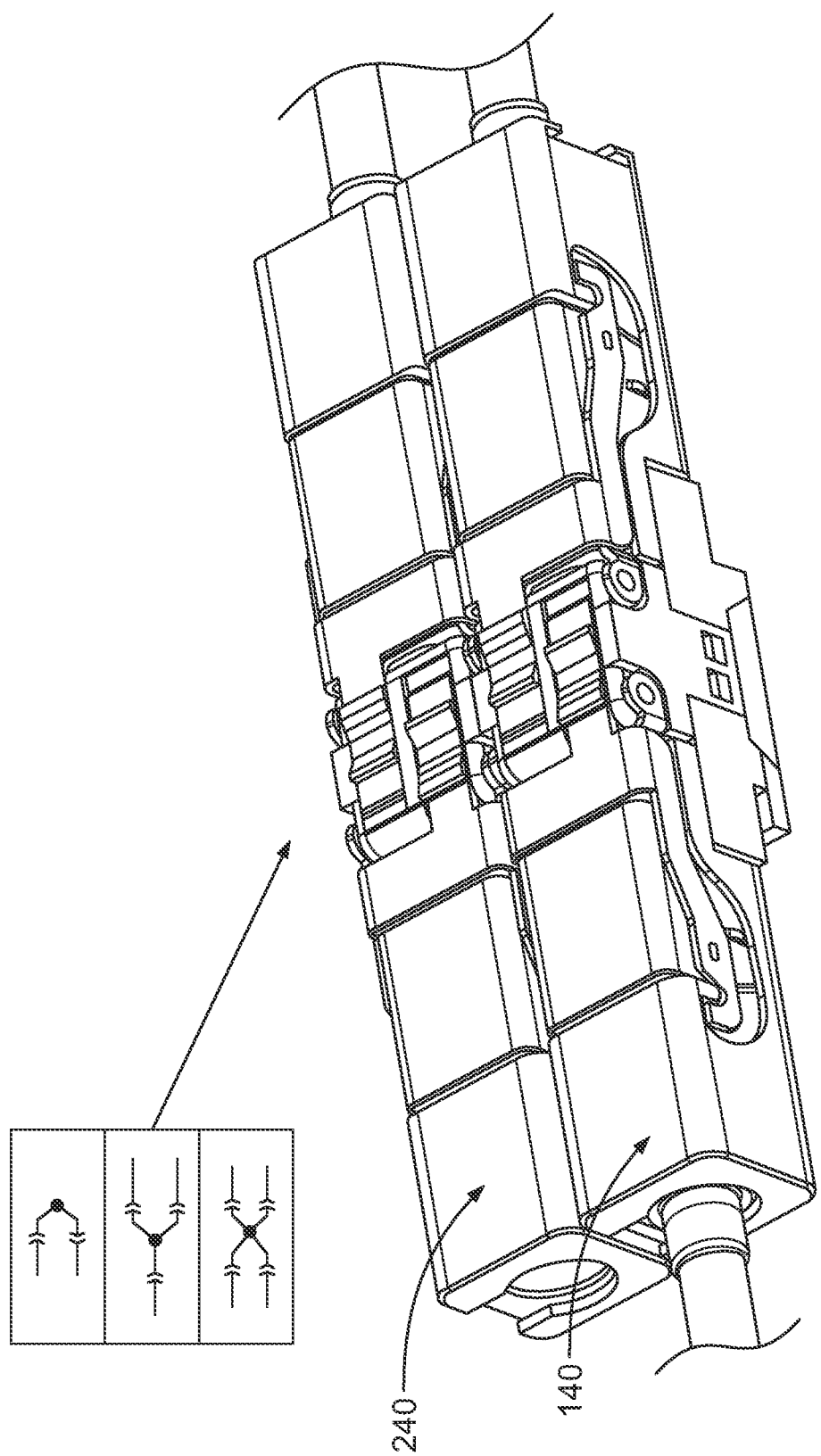

MODULAR FIXING SYSTEM AND METHOD THEREOF

CROSS-REFERENCE TO RELATED APPLICATIONS

This application is a continuation of PCT International Application No. PCT/EP2020/083678, filed on Nov. 27, 2020, which claims priority under 35 U.S.C. § 119 to European Patent Application No. 19306545.5, filed on Dec. 2, 2019.

FIELD OF THE INVENTION

The invention relates to a fixing system for affixing a plurality of modules to a rail fixture and a method of using the same.

BACKGROUND

Fixing systems that affix, i.e. mechanically connect, a plurality of similar or identical modules to a support structure are used in a number of technical applications. Frequent examples are electrical systems connecting a plurality of electric or electronic modules to a support structure or hydrodynamic systems connecting a plurality of hydrodynamic modules such as valves to a support structure. Electrical fixing systems may be used in a number of power and/or data distribution systems such as terminal blocks or network racks. Hydrodynamic fixing systems may be used, for instance, in valve clusters.

Generally, it is desirable to provide a versatile fixing system that allows connecting different numbers of modules to the support structure without having to exchange or even redesign the support structure. Furthermore, the mechanical connection between the modules and the support structure must be easy to establish, yet at the same time robust against external forces such as vibrations. This is particularly important in the case of electrical and electronic systems where a stable electric or electronic connection between power or data cables must be guaranteed.

SUMMARY

A fixing system includes a rail fixture having a plurality of first interlocking devices arranged along the rail fixture and a plurality of interlocking modules each having a second interlocking device. The interlocking modules are affixed to the rail fixture by inserting the second interlocking devices through a plurality of gaps between the first interlocking devices and sliding the interlocking modules along the rail fixture into a positive lock.

BRIEF DESCRIPTION OF THE DRAWINGS

The invention will now be described by way of example with reference to the accompanying Figures, of which:

FIG. 3A is a perspective view of an interlocking module in a positive lock with a rail fixture according to the present invention;

FIG. 3B is a sectional perspective view of the interlocking module of FIG. 3a;

FIG. 5A is an exploded perspective view of a power distribution terminal cassette according to an embodiment;

FIG. 5B is a perspective view of the power distribution terminal cassette; and

FIG. 6 is a perspective view of a connection configuration of the power distribution terminal cassette.

DETAILED DESCRIPTION OF THE EMBODIMENT(S)

Features and exemplary embodiments as well as advantages of the present disclosure will be explained in detail with respect to the drawings. It is understood that the present disclosure should not be construed as being limited by the description of the following embodiments. It should furthermore be understood that some or all the features described in the following may also be combined in alternative ways.

Figure 1:
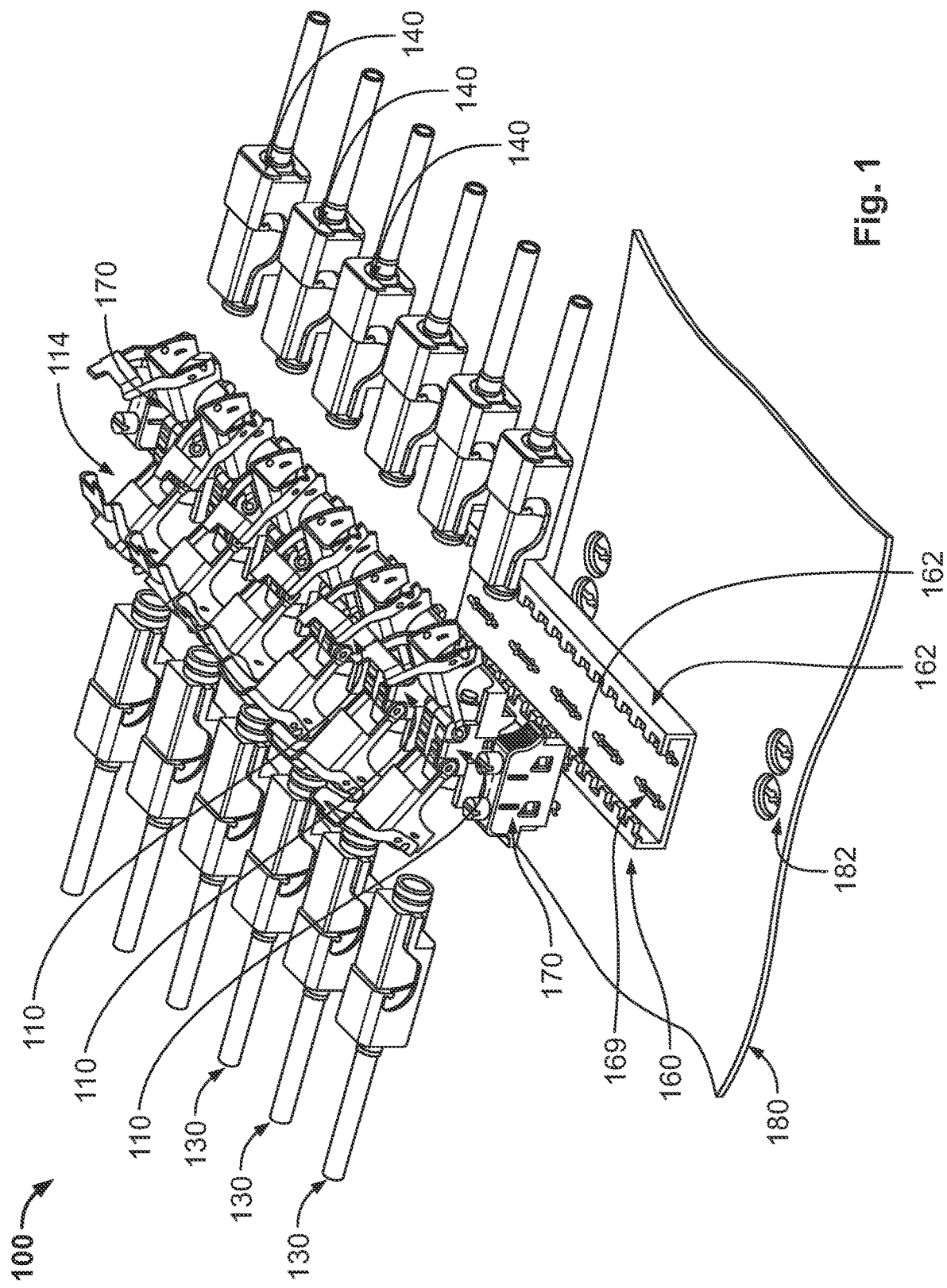
FIG. 1 shows an exploded schematic view of an exemplary fixing system according to the present invention.
Figure 2:
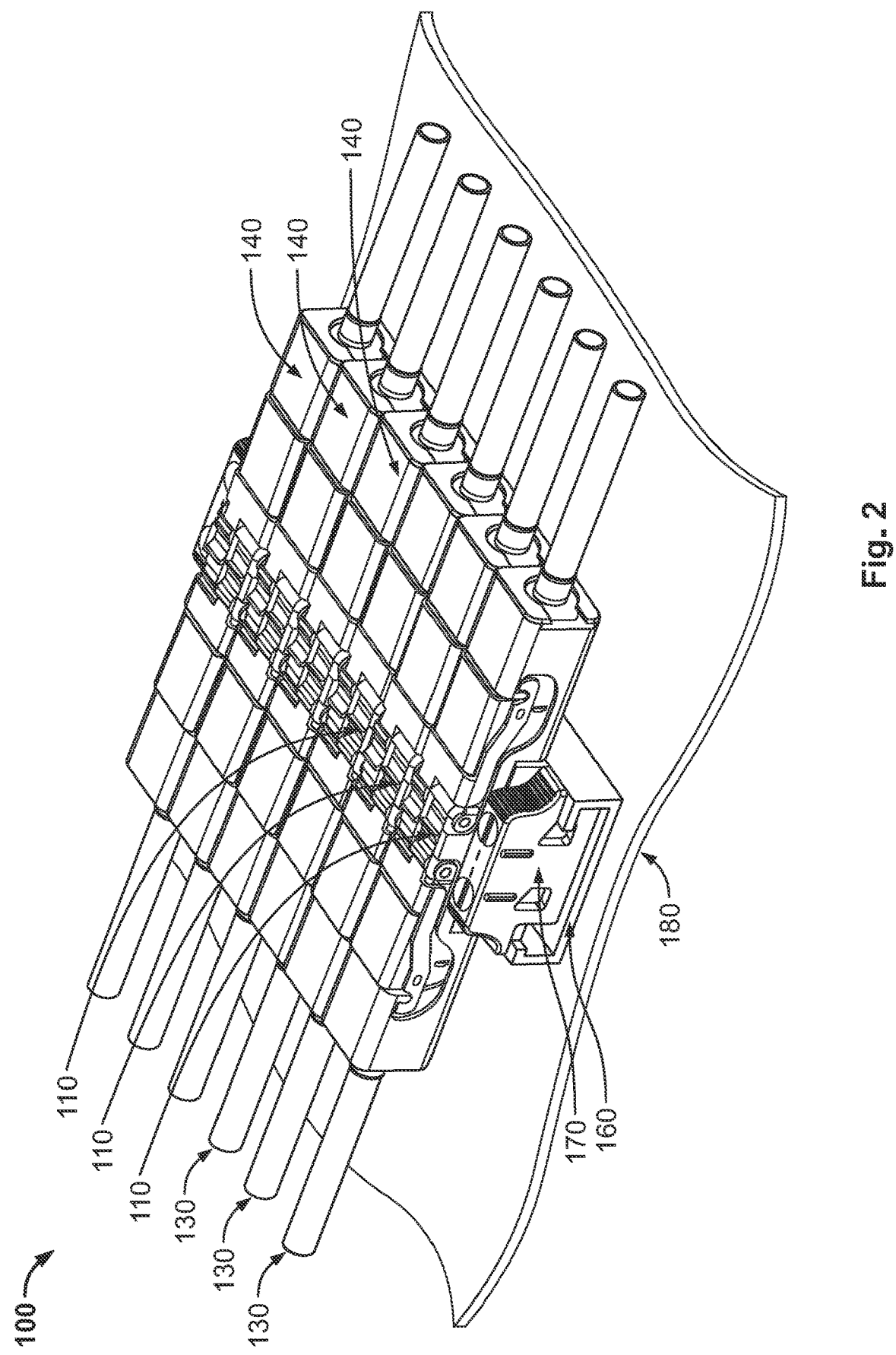
FIG. 2 shows the fixing system of FIG. 1 in an assembled state.

FIG. 1 shows an exploded schematic view of an exemplary fixing system 100 according to the present invention. FIG. 2 shows the same fixing system 100 in an assembled state.

The fixing system 100 of the present invention is illustrated in the Figures with reference to a power connection system wherein the interlocking modules are modular terminal cassettes and/or power distribution terminal cassettes. It is, however, understood that the present invention is not limited to a power connection system but may equally be applied to connection systems for data, valve clusters, or other connection systems with modular connection components.

The exemplary fixing system 100 as illustrated in FIG. 1 comprises a plurality of interlocking modules 110 in the form of modular terminal cassettes that are mounted on a rail fixture 160 by positive locking as described in further detail below. According to the invention, a rail fixture 160 is provided as an elongated fixing element in the general form of a rail. Here and in the following, the term rail is not limited to T-beams and I-beams but includes elongated fixing elements with nearly arbitrary cross-sections. By way of example, rail fixtures with an essentially U-shaped cross-section or an essentially X-shaped cross-section are provided. Variations of the above-mentioned cross-sections and beams are also included.

As shown in FIG. 1, the rail fixture 160 comprises a first interlocking device 162 to provide a positive fit with corresponding second interlocking devices of the interlocking modules 110. In an embodiment, the first interlocking devices 162 are provided as one or more sequences of identically formed interlocking elements or protrusions that are equidistantly arranged along the rail fixture 160. A more detailed view of the positive locking can be seen in the cross-sectional view of FIG. 3B. In the fixing system of FIGS. 1 and 2, the interlocking modules 110 are inserted through the gaps between the first interlocking device 162 and slid along the rail fixture 160 to establish positive locking between the interlocking modules 110 and the rail fixture 160.

First, an end clamp fixture 170 is installed at one end of the rail fixture 160 wherein pins of the end clamp fixture 170 are inserted into through holes 169 of the rail fixture 160. Subsequently, a desired number of interlocking modules 110 are inserted and slid along the rail fixture 160 until touching the end clamp fixture 170 and each other. The number of interlocking modules 110 can be freely chosen as long as it is compatible with the length of the rail fixture 160. Finally, a second end clamp fixture 170 is inserted with its pins through respective through holes 169 of the rail fixture 160 in close contact with the last interlocking module 110 in the line to secure the positive lock of the interlocking modules 110 with the rail fixture 160.

The rail fixture 160, with the interlocking modules 110 installed onto it, may then be mounted on a supporting structure 180 shown in FIGS. 1 and 2 by inserting the pins of the end clamp fixtures 170 into respective holes 182 of the supporting structure 180. The pins may then be locked using round inserts as shown in FIG. 1 by turning the pins into a locked position. Alternative locking devices may be devised as required. A possible support structure 180 that is conventionally used in an aircraft environment may be a metallic plate, also known as umbrella. Providing a series of through holes for the pins of the end clamp fixtures 170 along the rail fixture 160 at a distance corresponding to the lateral extent of the modular terminal cassettes 110 allows installing various numbers of modular terminal cassettes 110 on a specific rail fixture 160.

The fixing system 100 according to the present invention provides electrical connection for a plurality of feeder cables 130 in a simple and robust way. To this end, each feeder cable 130 according to the illustrative embodiment of FIGS. 1 and 2 is inserted into a respective feeder cable cassette 140 that is configured to establish mechanical and electrical connection with a standardized mechanical and electrical interface of the interlocking modules 110. To provide a stable connection of the feeder cable cassettes 140 with the interlocking modules 110, each interlocking module 110 of the exemplary embodiment of FIGS. 1 and 2 includes a separate locking system 114 for each electrical contact of the interlocking module 110. The supporting structure 180 may be mounted in a known way on structures of the respective environment such as a wall element, an aircraft, or a car.

FIGS. 3A and 3B show a three-dimensional and cross-sectional view of an interlocking module 100 in a positive lock with the rail fixture 160. For illustration purposes, a single interlocking module 110 with two feeder cable cassettes 140 connected to either side of the interlocking module mounted on the rail fixture 160 is shown. The cross-sectional view of FIG. 3B clearly shows the positive fit of a base part 120 of the interlocking module 100 with the first interlocking device 162 of the rail fixture 160.

The non-limiting illustrative example shown in the Figures uses an essentially U-shaped rail as the rail fixture 160. Aside from a planar base 168 of the rail fixture 160 that may be mounted on a support structure as explained in detail below with respect to FIGS. 4A-4J, the rail fixture 160 comprises side walls that surround a channel 161 and include first interlocking devices 162 at their upper ends. The first interlocking devices 162 according to the illustrated example include two sequences of teeth-like protrusions 163 that are equidistantly arranged along the entire length of the rail fixture 160 and separated by gaps. In the illustrated example, protrusions 163 and gaps 164 are provided with the same width. The present invention is, however, not limited to this configuration.

The two sequences of protrusions 163 are further arranged to face each other across the channel 161 provided in U-shaped rail fixture 160 or face away from each other along a rail of the rail fixture 160.

In the first case, a channel 161 is provided along the rail fixture 160 that is configured to receive the second interlocking devices 121. The channel 161 may be provided in the form of a U-shaped or an X-shaped cross-section of the corresponding part of the rail fixture 160. According to this first case, the protrusions 163 of the two first sequences face each other across the channel 161 wherein a gap is provided between protrusions 163 that face each other to allow sliding the interlocking modules 110 along the rail fixture 160. The shape and the size of the protrusions of the two first sequences may be identical to simplify the design, or may differ. To provide the above-described interlocking mechanism, the corresponding second sequences of the interlocking modules are arranged on the interlocking modules 110, for instance on a base part of the interlocking modules 110, such that protrusions 163 of the second sequences face away from each other and thus, face toward the protrusions of the respective first sequence. This arrangement provides a particularly stable positive lock between the first and second interlocking 162, 121 as the relatively large distance between the protrusions of the first sequences stabilizes the interlocking modules 110 against torque.

In the illustrated example, an offset is provided between the protrusions 163 of the two sequences such that the protrusions 163 of one of the sequences face gaps 164 of the other of the sequences and vice versa. This arrangement has the benefit of second interlocking devices 121 of the interlocking modules 110 that are symmetric with respect to a rotation by 180° with respect to the direction for inserting the interlocking modules 110.

Each of the two sequences of protrusions 163 may include two sequences arranged in parallel along the rail fixture 160. As will be described in further detail with respect to FIGS. 4C and 4A, the base part 120 of the interlocking modules 110 has second interlocking devices 121 that, in cooperation with the first interlocking devices 162 of the rail fixture 160, allow sliding the interlocking module 110 into a positive fit as shown in FIG. 3B.

The second interlocking devices 121 may comprise one or more interlocking elements or protrusions that are arranged equidistantly and designed to provide a positive lock in interaction with the first interlocking devices 162. Particularly, one or more sequences of interlocking elements may be provided along a direction of the interlocking modules 110 that, in the locked configuration, corresponds to the longitudinal direction of the rail fixture 160. The interlocking modules 110 may be provided with different numbers of second interlocking elements, e.g. different lengths of the sequences of interlocking elements. This may in particular be the case, when the interlocking modules are different, e.g. in terms of the number of electrical contacts of an electrical module. Alternatively, a plurality of identical interlocking modules 110 may be affixed to the rail fixture 160, thereby having the same number of second interlocking elements.

The second interlocking devices 121 are provided such that their protrusions 163 can be fully inserted through the gaps 164 between the protrusions 163 of the first interlocking devices 162. A gap 122 is provided between the protrusions of the second interlocking devices 121 and the body of the base part 120 with a width that allows sliding the interlocking module 110 along the rail fixture 160 and yet provides mechanical contact between the protrusions 163 of the first interlocking devices 162 and the protrusions of the second interlocking devices 121. By sliding the interlocking module 110 along the rail fixture 160, the protrusions of the second interlocking devices 121 are positioned behind the protrusions 163 of the first interlocking devices 162 when viewed from above in the direction of insertion to provide a positive fit. The channel 161 of the U-shaped rail fixture 160 is dimensioned to accommodate at least the second interlocking devices 121 after insertion through the first interlocking devices 162. It is understood that a large number of corresponding shapes of the interlocking elements of the second interlocking devices 121 and the gaps 164 between the first interlocking devices 162 can be thought of and are part of the present disclosure.

The second interlocking devices 121 are inserted through the corresponding gaps 164 such that the second interlocking devices 121 lie in a plane behind the first interlocking devices 162 when viewed in the direction of the insertion. In other words, the positive lock between the first and second interlocking devices 162, 121 is not provided through a lateral, i.e. in the longitudinal direction of the rail fixture 160, mechanical contact between the first and second interlocking devices 162, 121 but through mechanical contact in a vertical direction, i.e. orthogonal to the rail fixture 160 and in the direction of the insertion. The shape and arrangement of the first and the second interlocking devices 162, 121 are chosen in a way that the second interlocking devices 121 are slidable along the rail fixture 160 after fully inserting them through the gaps 164 between the first interlocking devices 162. In other words, the interlocking modules 110 can be slid along the rail fixture 160 after insertion of the second interlocking devices 121 to move the second interlocking devices 121 behind the first interlocking devices 162.

Each of the two first sequences of the first interlocking devices 162 may be associated with a corresponding one of the two second sequences of the second interlocking devices 121 to form a pair of sequences of protrusions as part of the interlocking mechanism as described above. To be insertable through the gaps 164 between the protrusions of the first sequence of the pair, the protrusions of the second sequence of the pair as well as their separation are configured as described above. However, the two first sequences, and similarly the two second sequences, do not have to be equal in terms of the design of their respective protrusions. It is merely required that corresponding first and second sequences are designed and arranged to provide the above-described interlocking mechanism. Thus, a shape, number, separation and/or thickness of the protrusions of one of the first sequences may be different from a shape, number, separation and/or thickness of the protrusions of the other of the first sequences wherein a shape, number, separation and/or thickness of the protrusions of the second sequences are adapted accordingly.

A thickness of the first interlocking devices 162 in the direction of the insertion may be chosen to be compatible with corresponding gaps 122 between the second interlocking devices 121 and the body of the respective interlocking module 110. In other words, the thickness of the first interlocking devices 162 may be chosen so as to fit between the second interlocking devices 121 and the body of the respective interlocking module 110 in a way that mechanical contact between the first and the second interlocking devices 162, 121 is provided in the vertical direction while still allowing the interlocking module 110 to be slid along the rail fixture 160. By way of example, the thickness of the first interlocking devices 162 may be smaller by less than 1 mm, such as less than 0.5 mm, than the corresponding gap 122.

Inserting the second interlocking devices 121 through corresponding gaps 164 between the first interlocking devices 162 and sliding the interlocking modules 110 along the rail fixture 160 into a positive lock, wherein the second interlocking devices 121 are arranged behind the first interlocking devices 162 when viewed in the direction of insertion, allows for a quick and easy installation of the plurality of interlocking modules 110 on the rail fixture 160. At the same time, the positive lock between the first and second interlocking devices 162, 121 stabilizes the fixing system against vibrations.

The depicted feeder cable cassettes of FIGS. 3A and 3B are fully locked to the interlocking module 110 using the locking system 114 as will be described in further detail with respect to FIG. 5A. The cross-sectional view of FIG. 3B further shows the electrical connection between the electrical connector 111 of the interlocking module 110 and female electrical contacts of the feeder cable cassettes 140. An elastomeric O-ring may be provided between internal inserts of the feeder cable cassettes 140 and the body of the interlocking modules 110 to seal the electrical connection between the feeder cable cassettes 140 and the interlocking modules 110.

FIGS. 4A to 4J show a series of schematic views illustrating a method for installing a plurality of interlocking modules 110 on a rail fixture 160 according to the present invention.

The method is a generally performed before installing the entire fixing system on a support structure such as a wall or a structure element of a vehicle. However, depending on the configuration of the above described at least one locking element and the at least one through hole, the method may be performed even after the fixing system is installed on a support structure.

Figure 4A:
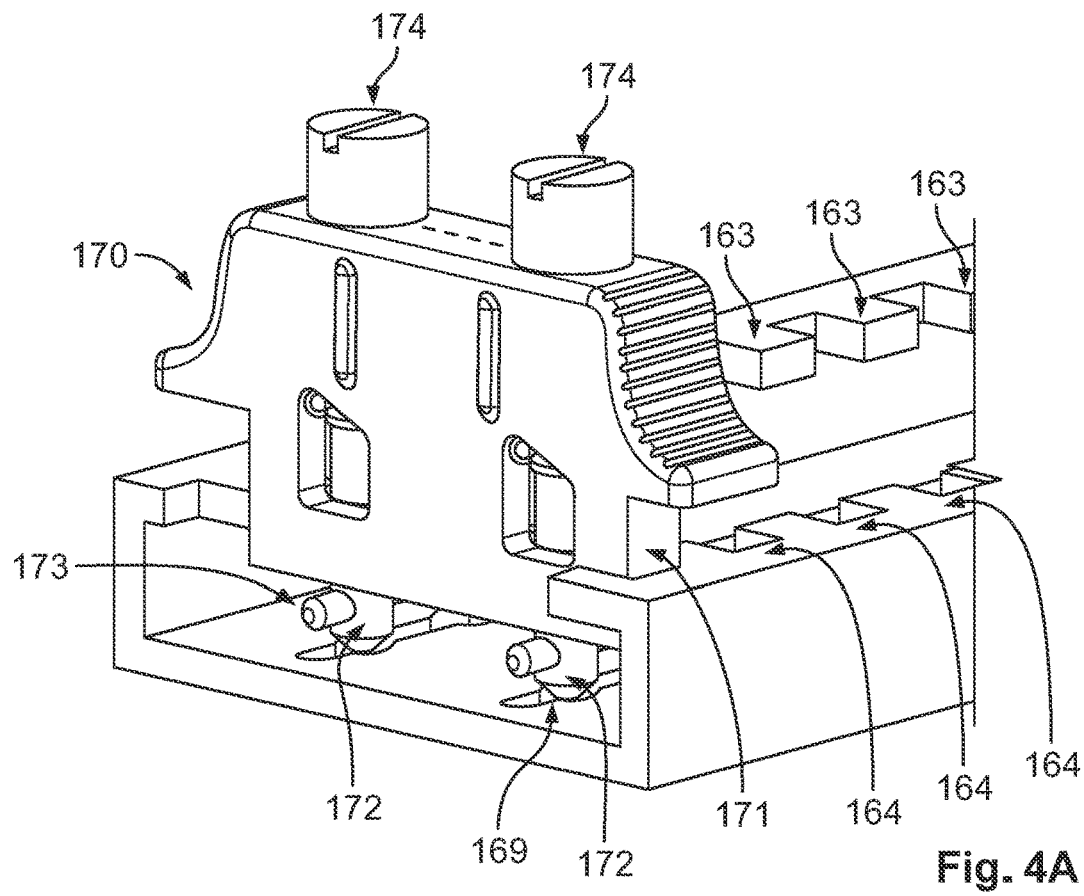
FIG. 4A is a perspective view of a first step of a method of installing a plurality of interlocking modules on a rail fixture.
Figure 4B:
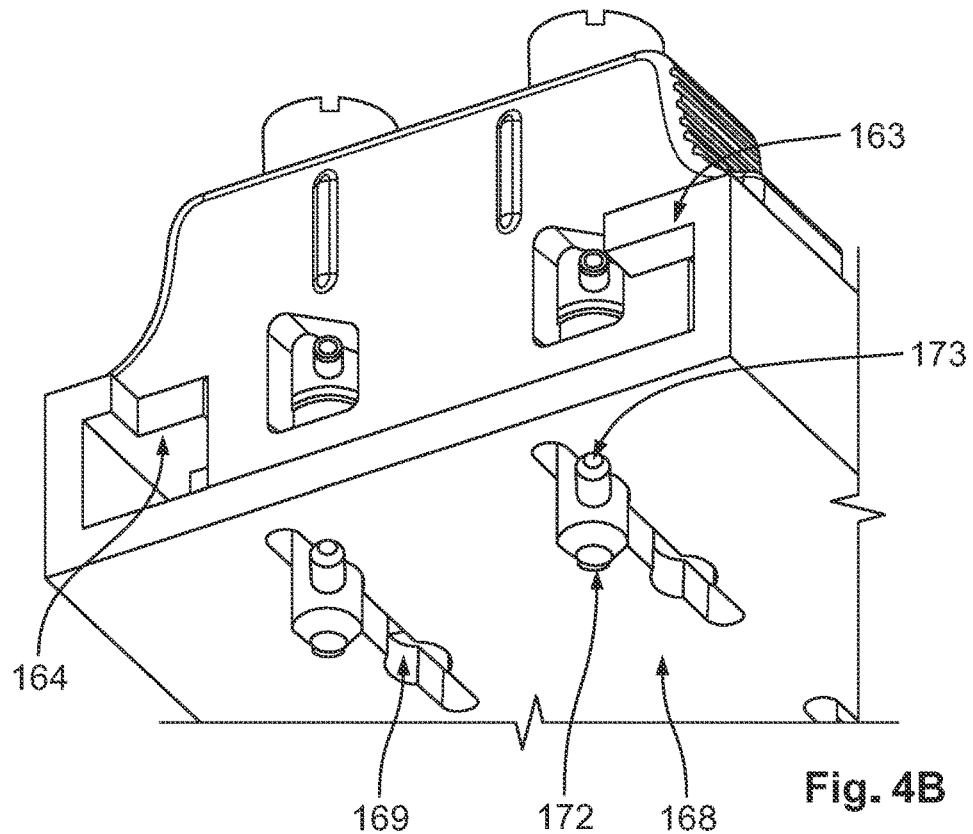
FIG. 4B is a perspective view of a second step of the method of installing the interlocking modules on the rail fixture.

In a first step, a first end clamp fixture 170 is installed on the rail fixture 160 as shown in FIGS. 4A and 4B. The end clamp fixture 170 comprises third interlocking devices 171 that, due to the offset between the protrusions 163 of the first interlocking devices 162, are arranged on only one side of the end clamp fixture 170. The present invention is, however, not limited to such a one-sided arrangement of the third interlocking device 171.

The end clamp fixture 170 further comprises two locking elements 172 in the form of pins with transversal elements 173 in the form of key bits. These locking elements 172 are configured to be insertable through correspondingly arranged and designed through holes 169 in the form of key holes as shown in FIGS. 4A and 4B when inserting the third interlocking devices 171 through a gap 164 of the first interlocking devices 162. By inserting the third interlocking devices 171 through the gap 164, a positive fit is established between the protrusions 163 of the first interlocking devices 162 and the end clamp fixture 170.

The at least one through hole 169 may be shaped and configured to mechanically engage the at least one corresponding locking element 172 to provide a positive lock or a frictional connection. By way of example, a diameter of the at least one through hole 169 may be chosen to be nearly identical to a diameter of a pin or a rivet as the at least one locking element 172. Alternatively, a screw may be used as the at least one locking element 172 and the at least one through hole 169 may be threaded to receive the screw. A large number of alternative designs of the through hole 169 and/or the locking element 172 may be devised. By way of example, a quarter round insert may be used to rivet the locking element 172 on the opposite side of the rail fixture 160 or of a support structure that the rail fixture 160 is mounted on.

The end clamp fixtures 170, after inserting the third interlocking device 171 through corresponding gaps 164, remain in the same position along the rail fixture 160. The positive lock between the third interlocking device 171 and the first interlocking device 162 is thus provided through lateral mechanical contact of the third interlocking device 171 with the first interlocking device 162. To this end, the third interlocking device 171 may be shaped and dimensioned so as to be insertable into corresponding gaps 164 between the first interlocking device 162 while being laterally in contact with the first interlocking device 162.

According to the illustrative example of FIGS. 4A-4J, two sequences of equidistantly arranged key holes 169 are provided along the entire length of the rail fixture 160 to allow installing the end clamp fixtures 170 in a plurality of different positions. Consequently, a single rail fixture 170 may be used for the installation of various numbers of interlocking modules 110 in a number of different applications.

The exemplary end clamp fixture 170 of FIGS. 4A-4J further includes two screw heads 174 configured to allow turning the key bits 173 of the pins 172 into a locked position after inserting them through the key holes 169 as indicated in FIG. 4B. The end clamp fixture 170 may be installed at one end of the rail fixture 160 as shown in FIGS. 4A and 4B or at any other desired position along the rail fixture 160. After insertion of the third interlocking devices 171 through a gap 164 of the first interlocking devices 162, the end clamp fixture 170 is secured against sliding movements. FIG. 4B further shows the planar base 168 of the rail fixture 160 that may be mounted on a support structure as described below. The two or more first sequences of the first interlocking device 162 may be arranged such that the sequence of protrusions 163 lies in a plane that is parallel to the planar base 168.

Figure 4C:
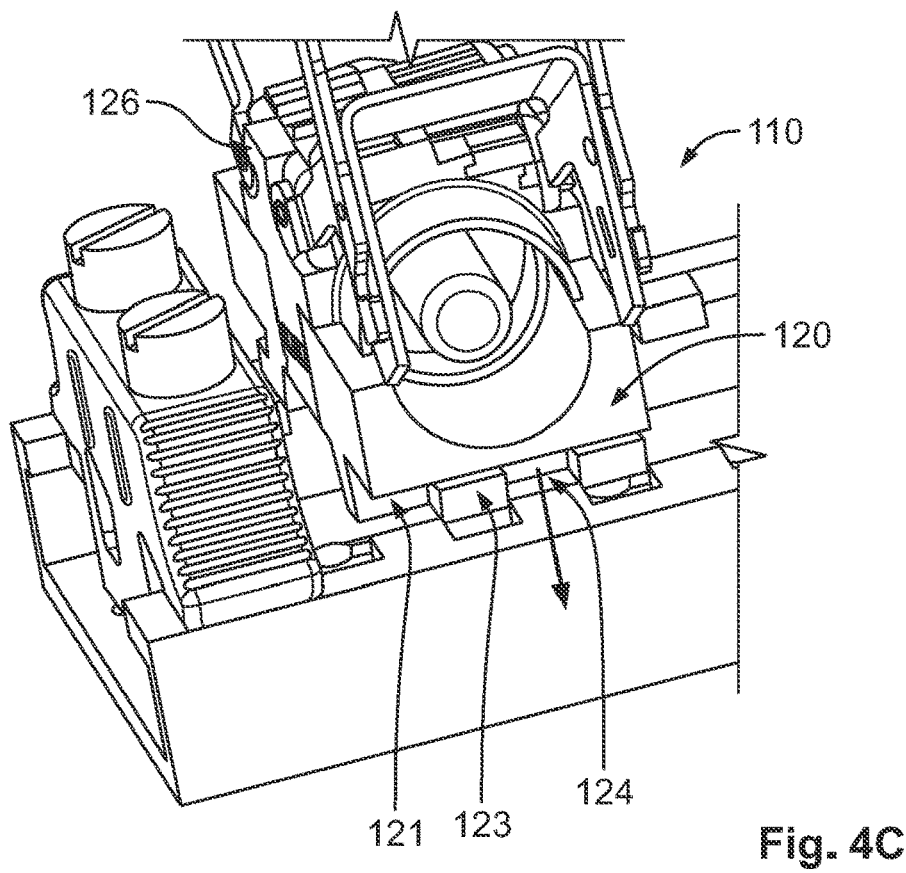
FIG. 4C is a perspective view of a third step of the method of installing the interlocking modules on the rail fixture.
Figure 4D:
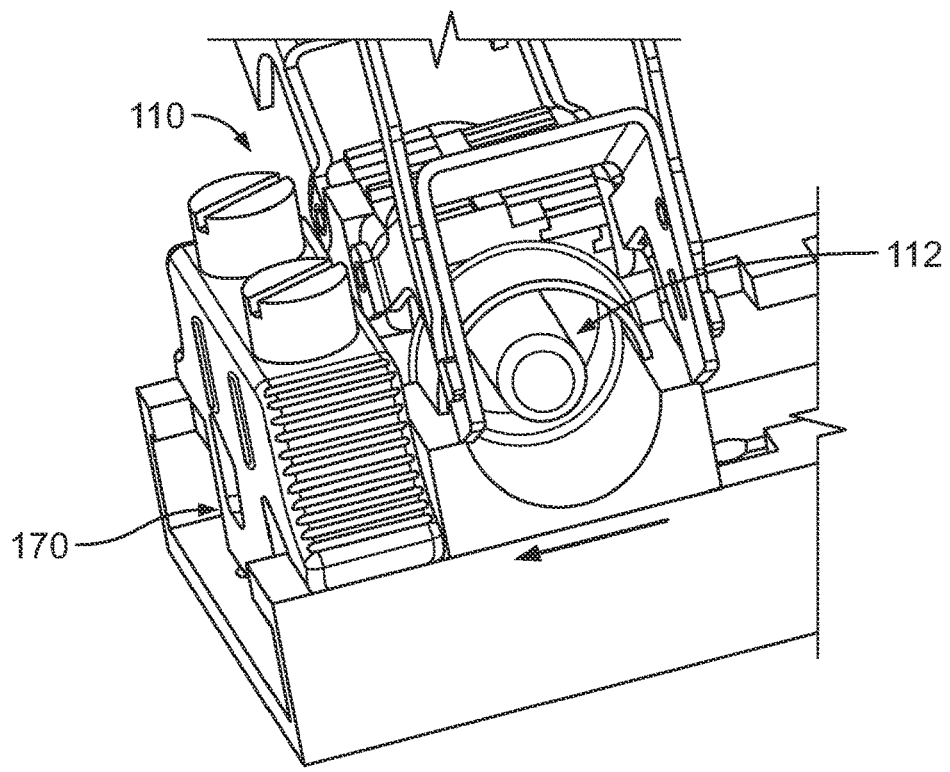
FIG. 4D is a perspective view of a fourth step of the method of installing the interlocking modules on the rail fixture.

FIGS. 4C and 4D illustrate the installation of a first interlocking module 110 on the rail fixture 160. As described in detail above, protrusions 123 of second interlocking devices 121 arranged on the base part 120 of the interlocking module 110 are inserted through gaps 164 of the first interlocking devices 162 as indicated by the direction arrow in FIG. 4C until the interlocking module 110 can be slid along the rail fixture 160. In the illustrated, non-limiting example, two sequences of protrusions 123 are arranged on the base part 120 of the interlocking module 110 to face outwardly, i.e. away from each other. The separation of the two sequences and the size and shape of the protrusions 123 are chosen such that they fit into corresponding gaps of the rail fixture 160 while still allowing the interlocking module 110 to be slid along the rail fixture 160.

After insertion of the second interlocking devices 121 through gaps between the first interlocking devices 162 of the rail fixture 160, the interlocking module 110 is slid sideways into abutment with the first end clamp fixture 170 as indicated by the arrow in FIG. 4D. As a result of this sliding movement, the protrusions 123 of the second interlocking devices 121 are positioned behind the protrusions 163 of the first interlocking devices 162 to provide a positive fit. Subsequently, the next interlocking module 110 may be inserted accordingly and slid into abutment with the already installed interlocking module 110 and so on. FIGS. 4C and 4D further show the upper part 126 of the interlocking module 110 and an electrical contact 112 of the interlocking module 110 in the form of a male contact. It is understood that the depicted embodiment serves to illustrate the present invention without limiting the invention to the particular shown configuration.

The interlocking modules 110, and in particular their second interlocking devices 121, may be configured such that, when a subsequently inserted interlocking module 110 is slid into abutment with a previously inserted interlocking module 110 that has already been slid into a positive lock with the first interlocking device 162, the subsequently inserted interlocking module 110 is automatically positioned in a lock position, i.e. a position along the rail fixture 160 where the respective second interlocking devices 121 are arranged behind the corresponding first interlocking devices 162.

Figure 4E:
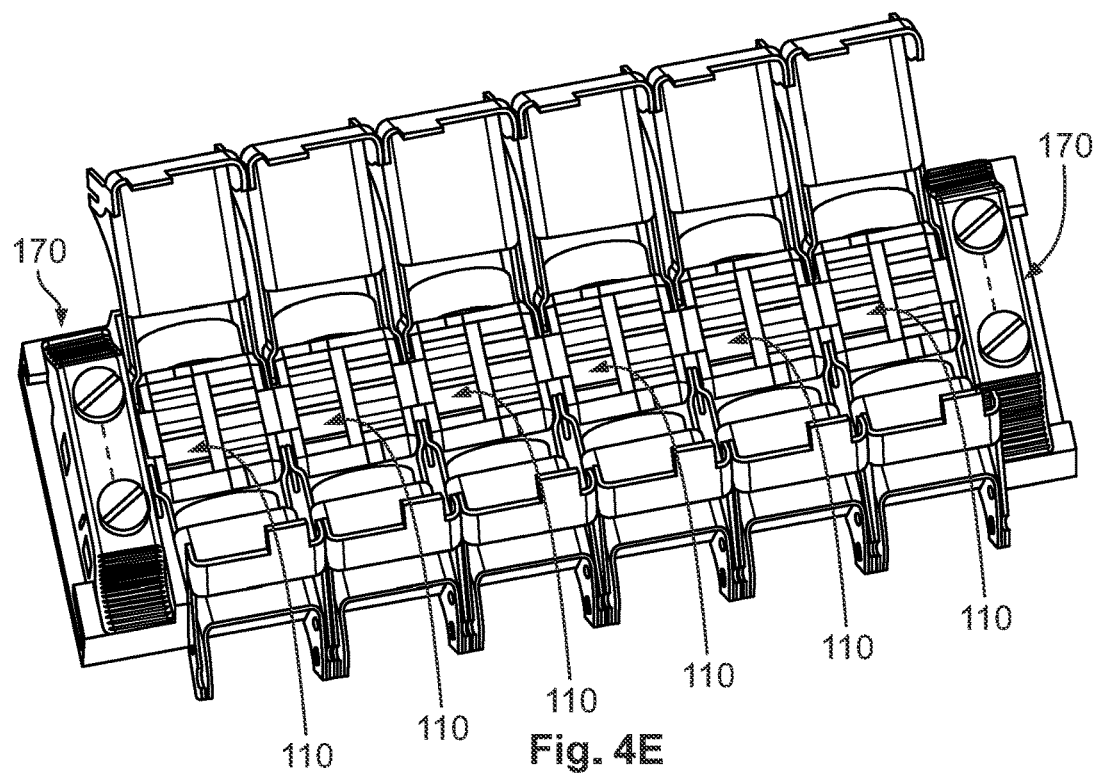
FIG. 4E is a perspective view of a fifth step of the method of installing the interlocking modules on the rail fixture.
Figure 4F:
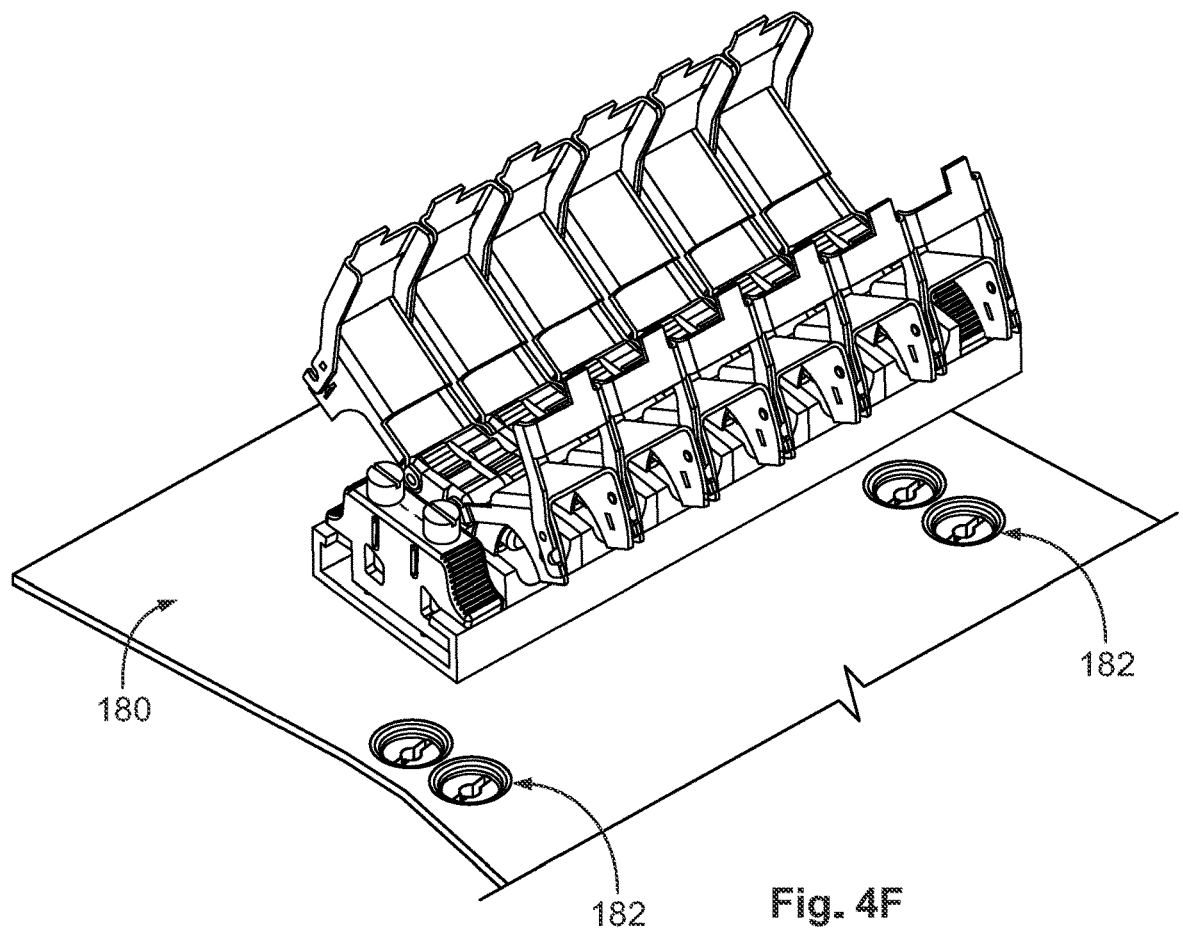
FIG. 4F is a perspective view of a sixth step of the method of installing the interlocking modules on the rail fixture.

FIGS. 4E and 4F show the fixing system 100 after the desired number of interlocking modules 110 has been installed on the rail fixture 160. The row of installed interlocking modules 110 is terminated by inserting a second end clamp fixture 170 as described above. FIG. 4E shows the second end clamp fixture 170 installed in abutment with the last installed interlocking module 110 to secure the row of interlocking modules 110 against sliding movements. The entire assembly may then be mounted on a support structure such as the support plate 180 shown in FIG. 4F.

Figure 4H:
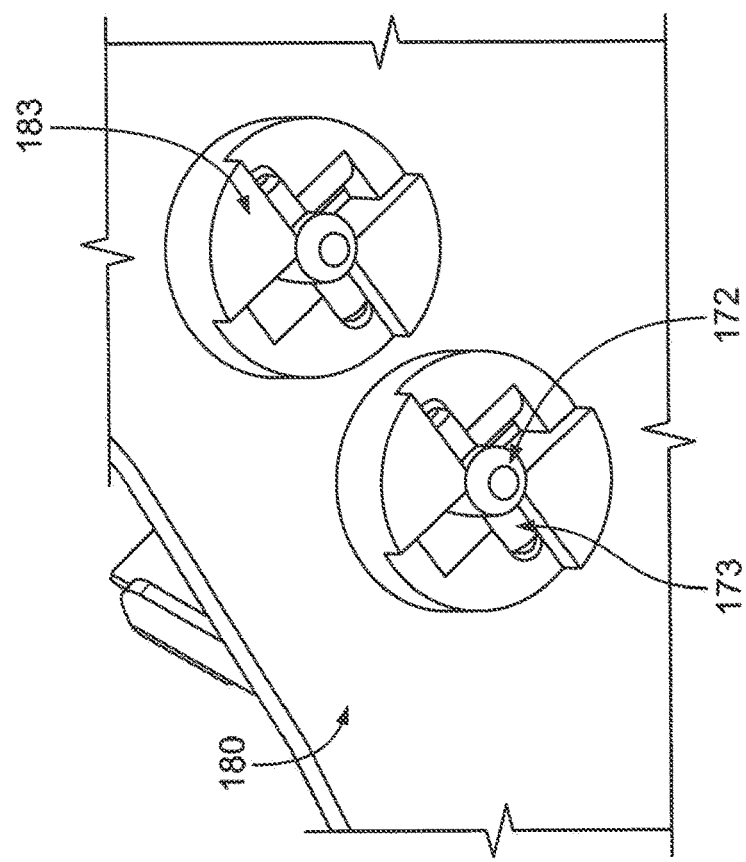
FIG. 4H is a perspective view of an eighth step of the method of installing the interlocking modules on the rail fixture.
Figure 4G:
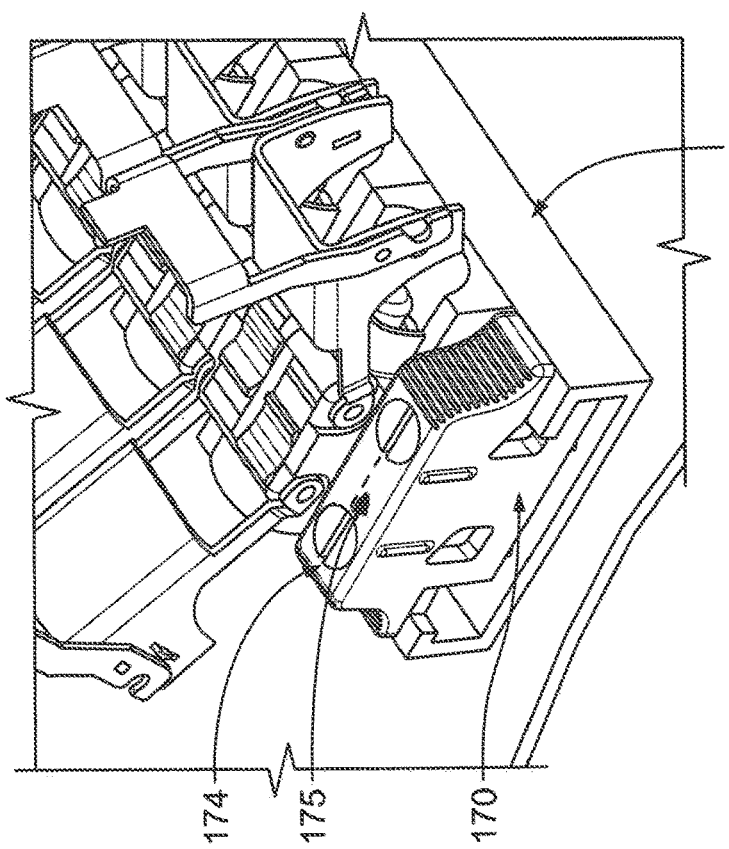
FIG. 4G is a perspective view of a seventh step of the method of installing the interlocking modules on the rail fixture.
Figure 4J:
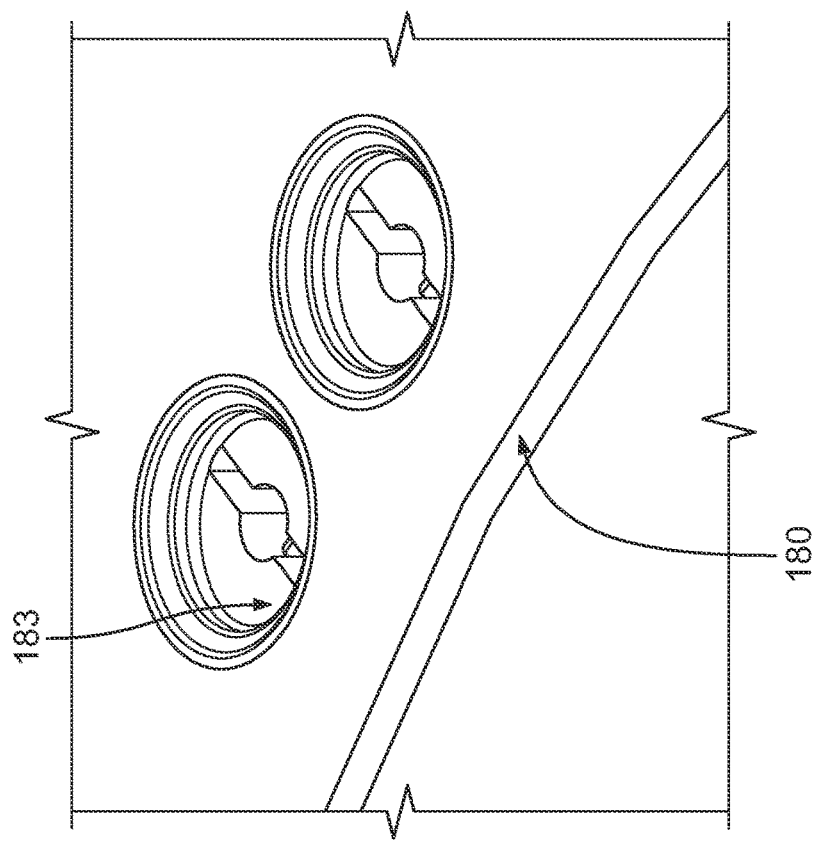
FIG. 4J is a perspective view of the inserts in the support plate.
Figure 4I:
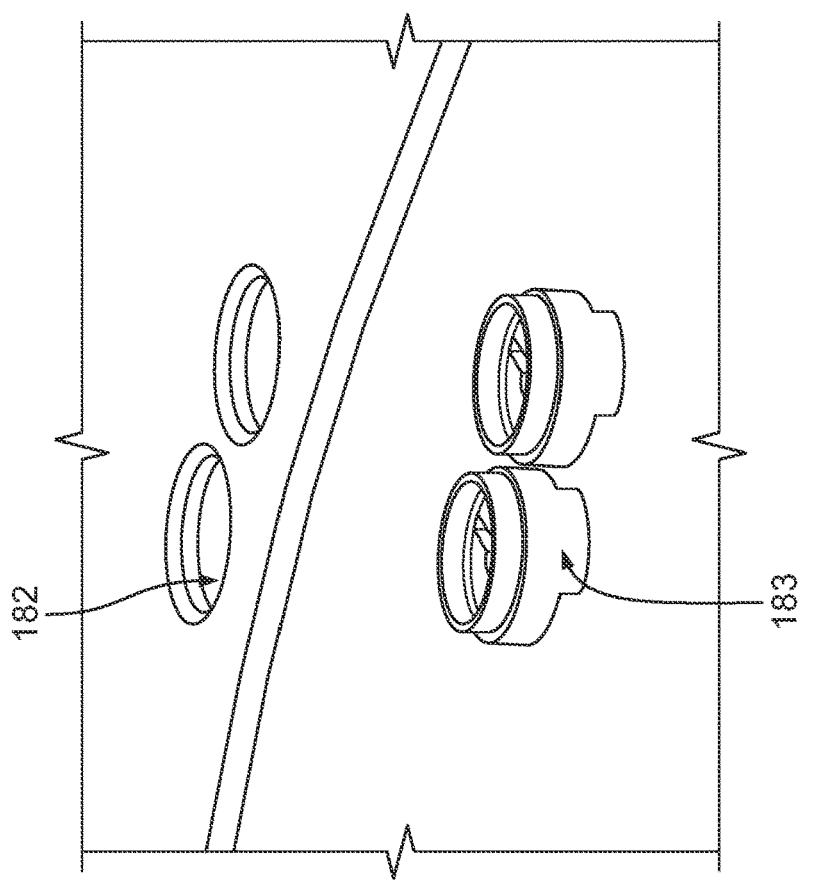
FIG. 4I is a perspective view of a support plate and inserts according to an embodiment.

The support plate 180 may be provided with holes 182 as shown in FIG. 4I that are configured to receive round inserts 183 as shown in FIG. 4J for locking the key bits 173 of the pins 172 on the opposite side of the support plate 180 as shown in FIG. 4H. To this end, the pins 172 and their key bits 173 are inserted through the holes 182 and the respective opening of the round inserts 183 until the planar base 168 of the rail fixture 160 is in contact with the upper side of the support plate 180. Then, the screw heads 174 of the end clamp fixtures 170 are used to turn the key bits 173 into a locked position of the round inserts 183 as shown in FIGS. 4G and 4H to secure them on the back side of the support plate 180.

A visual lock mark 175 is provided on a top side of the end clamp fixtures 170 as shown in FIG. 4G to allow visually checking whether the key bits 173 are in the locked position. Such a visual control element may for instance, be a colored stripe or a similar colored element provided on the outside of the body of the modular terminal cassette 110 that is covered by the sliding locking device unless in the locked position. The visual control element provides a simple way for a human operator to check whether the locking bracket 117 is correctly secured in the locked position.

It is understood that removing a single end clamp fixture 170 allows removing interlocking modules 110 from the rail fixture 160 without having to remove the entire assembly from the support plate 180. Furthermore, additional end clamp fixtures 170 may be installed along the rail fixture 160 to secure a long row of interlocking modules 110 against sideways movements as well as safely fix the rail fixture 160 to the support plate 180.

FIGS. 5A and 5B show a variant of the interlocking module of FIGS. 1 to 3 that is used to form a power distribution terminal cassette 190 as schematically shown in FIGS. 5A and 5B. In the illustrated, non-limiting example, two adjacent interlocking modules 110 are electrically connected using a shunt bar 150 to form a power distribution terminal cassette 190. It is understood that more than two adjacent interlocking modules 110 may be connected using a corresponding shunt bar 150. The shunt bar 150 may be covered with a non-conductive protection layer. The protection layer may be made of a non-conductive material such as an epoxy resin filling to protect the shunt bar 150 and to seal the assembly.

According to the illustrated, non-limiting embodiment of the interlocking modules 110, a body is provided that includes an upper part 126 and a base part 220, as shown in FIG. 5A. Alternatively, the body may be provided as an integral part, potentially together with the electrical connector 211.

In the depicted embodiment, an electrical connector 211 is provided with two male electrical contacts 112 and a shunt contact 119 that extends to the lower side of the interlocking module 110. In addition, the base part 220 of the interlocking module 110 has a through hole to receive the shunt contact 119. In the depicted embodiment, the shunt contact 119 reaches through the through hole into respective openings of the shunt bar 150. The shunt contacts 119 may be press fitted and/or riveted to the shunt bar 150. Finally, the shunt bar 150 may be covered by a non-conductive layer, such as an epoxy resin filling, to protect the shunt bar 150 and to seal the assembly.

Each of the modular terminal cassettes 110 of the power connection system may have the same structure such that each of the modular terminal cassettes 110 is formed with the through hole for the shunt contact 119. Alternatively, different types of modular terminal cassettes 110 may be used wherein only some of the modular terminal cassettes 110 have the through hole. The through hole may for instance, be arranged at a side of the modular terminal cassette 110 opposite the side of the modular terminal cassette 110 where the locking system 114 is arranged. By way of example, the through hole may be provided in a bottom side of the modular terminal cassette 110 while the locking system 114, specifically a pivot point for the cam 118 and the sliding locking devices, are arranged on a top side of the modular terminal cassette 110. To establish a shunt connection between the electrical connectors of the two or more adjacently arranged modular terminal cassettes 110, the electrical connectors, in addition to the at least two electrical contacts 112, have a shunt contact 119 electrically connected to the at least two electrical contacts 112.

Shunting two or more adjacent interlocking modules 110 as described above creates a power distribution terminal cassette 190 that may be used for power distribution according to a variety of configurations. In other words, an electrical connection between the feeder cables of respective feeder cable cassettes 140 connected to the two or more adjacently arranged modular terminal cassettes 110 is established. This makes bifurcated configurations wherein one feeder cable on one side of the power connection system is connected to two or more feeder cables on the other side of the power connection system and redundant configurations wherein two or more feeder cables on one side of the power connection system are jointly connected to two or more feeder cables on the other side of the power connection system possible.

The electrical connector 211 of the depicted example is further provided with a non-conductive insert, for instance made of a thermoplastic material, that surrounds part of the electrical contacts 112 to provide electrical insulation against the body parts 126 and 220. The body may be made of a metallic material to provide shielding against electromagnetic interference (EMI). In this case, the non-conductive insert prevents an electrical short between the electrical contacts 112 and the body of the interlocking module 110. Alternatively, the body parts 126 and 220 may be made of a non-conductive material that is metallized on the outside to provide shielding. By way of example, a non-conductive composite material may be used for the body parts 126 and/or 220 that is metallized at least on an external surface to provide the required shielding efficiency.

In addition, the rail fixture 160 may be made of or comprise a conductive material such that the bodies of the interlocking modules 110 are grounded to the support structure 180. This may be achieved by metallizing those parts of the rail fixture 160 in contact with conductive parts of the interlocking modules 110 and the support structure 180 and providing an electrically conducting path between them.

The upper and lower body parts 126 and 220 may be formed such that the male electrical contacts 112 are completely encapsulated with the exception of an opening for inserting a respective female electrical contact. To this end, the illustrated upper part 126 has a protective skirt for each male electrical contact 112. The body may be designed and configured to partly encase the at least two electrical contacts 112, in particular in such a way that a human operator is protected against electrical shock by accidentally touching the electrical contacts 112.

The interlocking module 110 according to FIGS. 5A and 5B is a standardized modular terminal cassette for electrical connection of two feeder cables 130 including a shunt contact 119 for shunting. In particular, the interlocking module 110 provides identical mechanical and electrical interfaces on both sides of the interlocking module 110. Consequently, a standardized feeder cable cassette 140 may be used to establish a mechanical and electrical connection with the interlocking module 110. The interlocking module 110 and the feeder cable cassettes 140 may further be used for establishing an electrical connection between two grounding wires connected to the respective feeder cable cassettes 140.

For a modular terminal cassette 110 with more than two electrical contacts 112 of the electrical connector, power distribution between one or more input feeder cables and one or more output feeder cables becomes possible. In any case, the electrical connector is configured such that all of the at least two electrical contacts 112 are connected to each other.

The at least two electrical contacts 112 may be configured as male contacts. Alternatively, the at least two electrical contacts 112 may be configured as female contacts. Correspondingly, the respective electrical contacts of their respective feeder cable cassettes are configured as female or male contacts, respectively. Configuring all electrical contacts 112 for connection to feeder cable cassettes as the same type allows using a standardized feeder cable cassette to establish the electrical connection. However, a modular terminal cassette may also comprise an electrical connector with mixed, i.e. one or more female and one or more male, electrical contacts.

According to an embodiment, mechanical connection with a respective feeder cable cassette 140 may be established by using a locking system 114 for securing the respective feeder cable cassette 130. In the exemplary, non-limiting embodiment according to FIGS. 5A and 5B, the locking system 114 comprises a locking bracket 117 and a cam 118. As can be seen in the figures, the cams 118 are pivotably mounted at the top of the upper body part 126. The locking brackets 117 are pivotably mounted on the cams 118, more specifically on a distal part of each cam 118 with respect to the pivot point of the cam 118. Furthermore, the locking system 114 includes sliding locking devices, i.e. in the form of a slider, to secure the locking brackets 117 in a locked position. The sliding locking devices may be provided with a spring that automatically moves the sliding locking devices into a locked position where they secure a respective part of the locking brackets 117. A visual control element in form of a colored stripe may be provided on the top of the upper body part 126 in such a way that it is visible only when the sliding locking device is in the locked position. The locking system 114 provides a very robust and reliable mechanical and electrical connection between the feeder cable cassettes 140 and the respective interlocking module 110.

The locking bracket 117 or part of the locking bracket 117 may be formed to be elastic with regard to manual deformation. In other words, the locking bracket 117 or the part of the locking bracket 117 may be formed of a material that is elastic with respect to forces applied by hand when pushing the locking bracket 117 into the locked position. As a result, the locking bracket 117 in the locked position is subject to a certain mechanical stress, in particular a flexural stress, that is counteracted by the sliding locking device. If the sliding locking device is retracted into an open position, the residual mechanical stress automatically moves the locking bracket 117 out of the locked position such that it can be easily grabbed by a human operator.

The residual mechanical stress due to the residual spring effect of the manually deformed locking bracket 117 or part of the locking bracket 117 provides a residual force on the feeder cable cassette 140 that pulls the electrical contact of the feeder cable into abutment with the electrical contact of the terminal cassette during all the connection lifetime. The result of this residual force is that the more the whole assembly is vibrating, the more the electrical contacts are kept in abutment. As a consequence, a risk of electric arcs due to fretting-corrosion when vibrating is reduced and length differences due to machining of the involved parts as well as due to wear of the parts during use are compensated for.

The locking system 114 may be provided in the form of a double locking system as part of the modular terminal cassette. Generally, a feeder cable cassette 140 may accommodate one or more feeder cables and include a corresponding number of electrical contacts. The present embodiment, however, particularly provides for electrical connection to standardized feeder cable cassettes 140 that accommodate one single feeder cable each such that the corresponding modular terminal cassette is provided with a separate locking system 114 for each of the at least two electrical contacts 112.

The locking bracket 117 and the sliding locking devices may be configured to mechanically engage respective elements of the feeder cable cassette 140 and the locking bracket 117, respectively, without the use of screws. To this end, the locking bracket 117 and/or the sliding locking devices may be designed to provide positive locking with corresponding elements. By way of example, the locking bracket 117 may comprise one or more recesses, cams, clamps, clips, loops, hooks, or the like to engage corresponding protrusions, pins, recesses, holes, hooks, or the like of the feeder cable cassettes 140. The sliding locking devices may in particular, be configured as a slider that, when in a locked position, mechanically blocks a corresponding part of the locking bracket from moving out of its locked position.

By using a double locking system, the respective feeder cable cassette 140 can be secured in a connected position with respect to vibrations and other forces that may occur in the respective field of application. Therefore, a reliable electrical connection between the feeder cable and the electrical connector can be guaranteed. The mechanical connection between the feeder cable cassette 140 and the modular terminal cassette 110 can be established without the use of screws or other loose connection means that may pose a risk as potential FOD. Furthermore, mechanically engaging the feeder cable cassette 140 instead of directly engaging the feeder cable makes it possible to maintain the electrical connection between the electrical contacts of the feeder cable and the modular terminal cassette 110 without any spring effect on the feeder cable that, in the long run, may lead to fretting corrosion of the electrical contacts 112 and damage of the feeder cable due to vibrations. As a result, cylindrical electrical contacts 112 may be used in the power connection system, even in an environment with high safety standards such as aircraft. The double locking system allows for a quick connection ensuring secure mating of the electrical contacts 112 of the feeder cable cassette 140 and the modular terminal cassette 110. Due to the modularity of the system, a nearly arbitrary number of configurations of a corresponding power connection system may be realized.

The cam 118 may comprise corresponding levers for being pivotably mounted on the body of the modular terminal cassette 140. The cam 118 and/or the locking bracket 117 may be made of a metallic material such as a single metal or an alloy of metals. Alternatively, the cam 118 and/or the locking bracket 117 may be made of a robust non-metallic material such as a thermoplastic. The cam 118 and the locking bracket 117 may be designed and arranged at the modular terminal cassette 110 in such a way that they can be operated without interfering with the locking system 114 of an adjacent modular terminal cassette 110.

As mentioned above, two or more adjacent interlocking modules 110 may be shunted to create a power distribution terminal cassette 190 that may be used for power distribution according to a variety of configurations.

The modular power connection system comprises a plurality of modular terminal cassettes 110 according to one of the above-described embodiments, and a plurality of feeder cable cassettes 140 for connecting respective feeder cables to the modular terminal cassettes 110. The power connection system is thus configured to provide a modular and extensible system for connecting a plurality of feeder cables, i.e. electrical cables for power supply, in a simple and tool-less way.

The feeder cable cassettes 140 may be designed and formed in a standardized way such that any feeder cable cassette 140 may be connected to any of the plurality of modular terminal cassettes 110. Generally, a feeder cable cassette 140 may be configured to accommodate exactly one feeder cable. As mentioned above, variants of the feeder cable cassette 140 may be provided that accommodate more than one feeder cable. In this case, dimension and form of the feeder cable cassette 140 may be chosen to allow for connection to two or more adjacent modular terminal cassettes 110 of the power connection system. Consequently, a power connection system is provided that provides standardized electrical interfaces of the modular terminal cassettes 110 and the feeder cable cassettes 140 by providing a standardized, constant separation of adjacent electrical contacts of a series of adjacently arranged modular terminal cassettes 110 and a standardized form and encasing of corresponding elements of the modular terminal cassettes 140 and the feeder cable cassettes 110.

Each feeder cable cassette 140 may comprise an, in particular rigid, external body having openings for receiving a feeder cable and for exposing an electrical contact 112, wherein the external body has at least one first engaging element for engaging a respective cam 118 of a respective modular terminal cassette 110. The external body may have a standardized structure and shape such that the feeder cable cassettes 140 may be interchangeably connected to different modular terminal cassettes 110. The external body may have a shape that allows holding and handling the feeder cable cassette 140 in a comfortable way. The external body of the feeder cable cassette 140 is formed to be essentially closed with the exception of the openings for the feeder cable and exposing the electrical contact 112.

The external body may be formed of a rigid material such as a metal or metal alloy or non-conductive composite material. By way of example, a thermoplastic may be used as the material for the external body. By using a rigid material for the external body, a robust and stable encasing of the electrical contact 112 and the end of the feeder cable is provided that can furthermore be easily handled by a human operator. Additionally, the external body prevents a spring effect on the feeder cable that may damage the electrical connection and/or the feeder cable due to vibrations.

The external body of the feeder cable cassette 140 may be provided with at least one first engaging element for mechanically engaging a respective cam 118 of a respective modular terminal cassette 110. The at least one first engaging element of the external body may be formed so as to provide a positive locking with the cam 118 when the locking system 114 is in the locked position. The at least one first engaging element may be formed for instance, as one or more protrusions, recesses, pins, holes or the like. By way of example, the at least one first engaging element may be provided as at least one recess on the external body, in particular on two opposite sides of the external body. The at least one first engaging element may be formed as an integral part of the external body to provide a robust engaging element.

The at least one first engaging element and the respective cam 118 of the respective modular terminal cassette 110 may be formed so as to pull the electrical contact of the feeder cable cassette 140 into abutment with a respective electrical contact 112 of the electrical connector of the respective modular terminal cassette 110 upon moving the respective locking bracket 117 into the locked position. In other words, the at least one first engaging element and the cam 118 may have a shape and arrangement that, when pivoting the cam 118 into the locked position, makes a contact surface of the cam slide along a corresponding contact surface of the at least one first engaging element such that a force on the feeder cable cassette 140 toward the electrical contact of the modular terminal cassette 110 results. This specific configuration of the cam 118 and the first engaging element provides a simple and intuitive way to establish a secure mechanical and electrical connection between the modular terminal cassette 110 and the feeder cable cassette 140.

The external body of the feeder cable cassette 140 may be provided with at least one second engaging element for mechanically engaging a respective locking bracket 117 of a respective modular terminal cassette 110 wherein the at least one second engaging element may in particular be arranged so as to secure the electrical contact 112 of the respective modular terminal cassette 110 in abutment with the respective electrical contact of the electrical connector of the respective modular terminal cassette 110 when the respective locking bracket 117 is in the locked position. Consequently, the at least one the second engaging element is structurally different from the at least one first engaging element. In other words, the external body may have at least two separate engaging elements for mechanically engaging the locking bracket 117 and the cam 118 of the locking system 114 of a respective modular terminal cassette 110.

One or more protrusions of the external body, pins, recesses, holes, or the like may be provided as the at least one second engaging element configured to mechanically engage respective elements of the locking bracket 117 such as the above-mentioned one or more recesses, cams, clamps, clips, loops, hooks, or the like. The at least one second engaging element may in particular be integrally formed with the external body to be more robust. By way of example, protrusions may be formed on two opposite sides of the external body to mechanically engage with a corresponding clamp or hook of the locking bracket. The locking bracket 117 and the at least one second engaging element of the feeder cable cassette 140 may be configured such that a positive fit may be established between the at least one second engaging element and the locking bracket 117, more specifically one or more corresponding engaging elements of the locking bracket 117, by pivoting the locking bracket 117 into the locked position. Furthermore, arrangement and shape of the at least one second engaging element may be such that the feeder cable cassette 140 upon mechanical engagement with the locking bracket 117 is secured against slipping out of mechanical and electrical contact with the modular terminal cassette 110. In other words, the at least one second engaging element may be arranged so as to secure the electrical contact of the respective modular terminal cassette 110 in abutment with the respective electrical contact 112 of the electrical connector of the respective modular terminal cassette 110 when the respective locking bracket 117 is in the locked position.

The present disclosure in particular provides a modular power connection system with a plurality of modular terminal cassettes 110, each of the modular terminal cassettes 110 being configured to provide electrical connection of two feeder cables by mechanically connecting and engaging the respective feeder cable cassettes 140 with the corresponding locking systems of the modular terminal cassettes 110. As mentioned above and described in further detail below, two or more adjacent modular terminal cassettes 110 may be shunted to provide a power distribution configuration. According to a particular embodiment of the modular power connection system, each of the modular terminal cassettes 110 may have the same constructive design and each of the feeder cable cassettes 140 may have the same constructive design. Alternatively, as mentioned above, the modular terminal cassettes 110 and/or the feeder cable cassettes 140 may have different configurations with regard to the number and arrangement of electrical contacts 112 while their electrical and mechanical interfaces remain standardized.

Examples of such configurations are shown in FIG. 6 that additionally shows an exemplary configuration wherein a single feeder cable is connected on one side of the power distribution terminal cassette as an electrical input and wherein two feeder cables are connected as electrical outputs on the opposite side of the power distribution terminal cassette. As a result, a bifurcation is created using a shunt bar 150 for two adjacent interlocking modules 110. The remaining, unused electrical contact of the power distribution terminal cassette may be protected by connecting a blind cable cassette 240 that has the same mechanical structure as the feeder cable cassettes 140 but does not provide an electrical contact. The blind cable cassette 240 is provided as a dummy to be connected to an electrical contact of a power distribution terminal cassette that is to remain unconnected. The blind cable cassette 240 thus serves the purpose of protecting any unconnected electrical contacts of the power distribution terminal cassette. Using shunt bars 150 of the appropriate length and blind cable cassettes 240 to protect unconnected electrical contacts allows realizing nearly any desired configuration of the power distribution system.

Further exemplary configurations wherein all feeder cables are connected on one side of the power distribution terminal cassette or two input feeder cables are jointly connected to two output feeder cables are shown in the insert of FIG. 6. Longer shunt bars 150 allow for a nearly unlimited number of power distribution configurations. The shunt bar 150 may have a length corresponding to the number of adjacent modular terminal cassettes to be shunted. As a result, a nearly arbitrary number of power distribution configurations may be realized by forming corresponding power distribution terminal cassettes from standardized modular terminal cassettes.

Providing second interconnection devices 121 with an offset between the protrusions of two sequences of equal length as shown in FIG. 5B allows shunting two or more adjacently arranged interlocking modules 110 without affecting the interlocking mechanism described above. As can be seen from the exemplary power distribution terminal cassette 190 of FIG. 5B, the combined second interlocking devices 121 of the power distribution terminal cassette 190 may be inserted through gaps 164 of the first interlocking devices 162 in just the same way as for a single interlocking module 110. The particular configuration thus provides a very convenient way to build power distribution systems using the above-described fixing systems.

The present disclosure provides a highly versatile and easy-to-install power connection system with standardized mechanical and electrical interfaces. The system is lightweight and at the same time very robust, in particular with respect to the above-described specific requirements of the targeted installation environments. As no loose parts are used for the mechanical connection of the interlocking modules and the feeder cable cassettes, the risk of damage by foreign object debris (FOD) is significantly reduced. The locking system further provides a quick connection mechanism which guarantees secure mating and cable alignment. No tools are needed to connect or disconnect the feeder cable cassettes. The components may be configured to provide EMI shielding. The power connection system can be scaled for application in different technical environments such as aircraft, automotive environments or offshore installations.

The described rail fixtures 160, modular terminal cassettes 110, feeder cable cassettes 140 and power connection systems provide a versatile and robust way of connecting a plurality of power supply lines in a variety of configurations and may be used without specific tools. The power connection systems are lightweight and reconfigurable. The terminals of the feeder cables may be individually sealed and shielded against EMI. By shunting adjacently arranged modular terminal cassettes 110, power distribution becomes possible. Use of standardized rigid feeder cable cassettes 140 and a fast and robust locking system 114 makes sure that no residual spring effect on the feeder cables remains.

What is claimed is:

1. A fixing system, comprising:
   a rail fixture having a plurality of first interlocking devices arranged along the rail fixture;
   a plurality of interlocking modules each having a second interlocking device, the interlocking modules are affixed to the rail fixture by inserting the second interlocking devices through a plurality of gaps between the first interlocking devices and sliding the interlocking modules along the rail fixture into a positive lock; and
   a pair of end clamp fixtures each affixed to the rail fixture, each of the end clamp fixtures has a third interlocking device inserted into the gaps between the first interlocking devices to form a positive lock between the first interlocking devices and the third interlocking device.

2. The fixing system of claim 1, wherein the first interlocking devices include a first sequence of protrusions equidistantly arranged along the rail fixture.

3. The fixing system of claim 2, wherein the second interlocking devices include a second sequence of protrusions equidistantly arranged and insertable through the gaps of the first interlocking devices between the first sequence of protrusions.

4. The fixing system of claim 3, wherein the first sequence of protrusions includes a pair of first sequences arranged in parallel along the rail fixture and the second sequence of protrusions includes a pair of second sequences arranged in parallel along each of the interlocking modules.

5. The fixing system of claim 4, wherein the protrusions of the pair of first sequences face each other across a channel in the rail fixture or face away from each other along a rail of the rail fixture.

6. The fixing system of claim 4, wherein the protrusions of one of the pair of first sequences face corresponding gaps of the other of the pair of first sequences.

7. The fixing system of claim 1, wherein the rail fixture has a through hole at each end receiving a locking element of the end clamp fixtures.

8. A method for affixing a plurality of interlocking modules to a rail fixture, comprising:
   providing the rail fixture having a plurality of first interlocking devices arranged along the rail fixture;
   providing the plurality of interlocking modules each having a second interlocking device;
   inserting a third interlocking device of a first end clamp fixture into one of a plurality of gaps between the first interlocking devices to establish a positive lock between the third interlocking device of the first end clamp fixture and the first interlocking devices of the rail fixture;
   consecutively affixing the interlocking modules to the rail fixture by inserting the second interlocking devices through the gaps between the first interlocking devices and sliding the interlocking modules along the rail fixture into abutment with the first end clamp fixture or a previously inserted interlocking module; and
   inserting the third interlocking device of a second end clamp fixture through the gaps between the first interlocking devices in abutment with a last inserted interlocking module to establish a positive lock between the second end clamp fixture and the rail fixture.

9. The method of claim 8, wherein inserting the third interlocking device includes inserting a locking element of the first end clamp fixture or the second end clamp fixture through a through hole of the rail fixture and locking the locking element to the rail fixture.

10. The method of claim 9, wherein locking the locking element to the rail fixture includes locking the locking element to a support structure underneath the rail fixture.

11. The method of claim 10, wherein the locking element is riveted to the support structure.

12. A modular power connection system, comprising:
a plurality of modular terminal cassettes electrically connecting a plurality of feeder cables; and
a plurality of feeder cable cassettes connecting the feeder cables to the modular terminal cassettes, each of the modular terminal cassettes has an electrical connector with a plurality of electrical contacts and a locking system securing one of the feeder cable cassettes, at least two of the modular terminal cassettes have a through hole for a shunt contact, a power distribution terminal cassette is formed by shunting adjacent modular terminal cassettes using a shunt bar.

13. The modular power connection system of claim 12, wherein the shunt contact of each of the modular terminal cassettes is press-fitted and/or riveted to the shunt bar.

14. The modular power connection system of claim 12, wherein the shunt bar is covered by a non-conductive protection layer.

15. The modular power connection system of claim 12, further comprising a blind cable cassette provided without a connection to one of the feeder cables.

16. The modular power connection system of claim 12, wherein the modular terminal cassettes are connected to an equal number of feeder cable cassettes on a side of the shunt bar.

17. The modular power connection system of claim 16, wherein the modular terminal cassettes are connected to a single feeder cable cassette on another side of the shunt bar opposite the side of the shunt bar.

* * * * *